Patented June 1, 1926.

1,586,803

UNITED STATES PATENT OFFICE.

WILLY O. HERRMANN AND ERICH BAUM, OF MUNICH, GERMANY, ASSIGNORS TO CONSORTIUM FUR ELECKTROCHEMISCHE INDUSTRIE, OF MUNICH, GERMANY.

PROCESS OF POLYMERIZING VINYL ESTERS.

No Drawing. Application filed August 8, 1925, Serial No. 49,104, and in Germany August 13, 1924.

It is known that by the polymerization of vinyl compounds by heating in the presence of catalyzers a more or less viscous mass is formed, U. S. P. 1,241,738 Oct. 2, 1917. According to this process, the amount of conversion into the polymerized form is not high. If vinyl acetate is treated with 0.1% benzoyl peroxide, even under pressure with temperatures up to 100° C. for two hours only 50 to 60% of the vinyl acetate is polymerized.

We have now found that the amount of polymerization may be increased by using organic or inorganic catalyzers in the presence of water. As catalyzers, inorganic or organic peroxides, persalts, peracids and the like, are suitable; for example one such is benzoyl peroxide. Solutions of hydrogen peroxide in water, solutions of persalts such as perborates, percarbonates, perphosphates or barium peroxide, calcium peroxide etc. in water are especially effective. The activity of solutions of hydrogen peroxide and organic peroxides in the presence of water may be still further increased by adding alkaline substances such as caustic soda, baryta, alkali metal phosphates, borates, ammonia, magnesium oxide, zinc oxide, aluminum oxide, hexamethylentetramine etc. The qualities of the products may be further modified by carrying out the reaction in the presence of organic solvents as for instance paraldehyde, glycol, glycerin, ethylene diacetate etc.

Water has also a favorable influence when the polymerization is carried out in the absence of other catalyzers as for instance by radiant energy or by heating, especially under pressure.

Example I.

100 parts of vinyl acetate are heated with 1.5 parts of a 3 per cent solution of hydrogen peroxide in an autoclave for two hours at 100° C. About 80% of the vinyl acetate is polymerized. The unpolymerized vinyl acetate is removed and recovered by blowing it off with steam. The remaining polymerized product is freed from water by melting. It forms a clear, hard, resinlike mass.

Example II.

100 parts of vinyl acetate are heated with 0.25 parts of sodium perborate and 1.5 parts of water as described in Example I. The amount of polymerization is about 85%.

Example III.

100 parts of vinyl acetate are heated with 0.25 parts of borax and 1.5 parts of 5% hydrogen peroxide as described in Example I. The amount of polymerization is about the same as in the foregoing example.

Example IV.

100 parts of vinyl acetate are heated with 0.1 part of benzoyl peroxide, 0.1 part of glycerin and 11.5 parts of 3% hydrogen peroxide as described above. The amount of polymerization is the same as in the foregoing example. The polymerization product obtained is more liquid in the molten state than if prepared without glycerin.

Example V.

100 parts of vinyl butyrate are heated with 2 parts of 3% hydrogen peroxide for two hours at 80–100° C. If the reaction temperature rises too high cooling is necessary. The product of polymerization which is obtained after removing the unaltered butyrate is a plastic and elastic mass.

What we claim is:

1. The process of polymerizing vinyl esters in the presence of water.

2. The process of polymerizing vinyl esters by heating in the presence of water.

3. The process of polymerizing vinyl esters by heating under pressure in the presence of water.

4. The process of polymerizing vinyl esters by heating with addition of catalyzers in the presence of water.

5. The process of polymerizing vinyl esters by heating with addition of catalyzers under pressure in the presence of water.

6. The process of polymerizing vinyl esters by heating, with addition of percompounds as catalyzers, under pressure in the presence of water.

7. The process of polymerizing vinyl esters by heating, with addition of hydrogen peroxide as catalyzer, in the presence of water.

8. The process of polymerizing vinyl esters by heating, with addition of hydrogen peroxide as catalyzer, under pressure in the presence of water.

9. The process of polymerizing vinyl esters by heating, with addition of catalyzers and an alkaline acting substance, in the presence of water.

10. The process of polymerizing vinyl esters by heating, with addition of catalyzers and an alkaline acting substance, under pressure in the presence of water.

11. The process of polymerizing vinyl esters by heating, with addition of percompounds as catalyzers and an alkaline acting substance, under pressure in the presence of water.

12. The process of polymerizing vinyl esters by heating with addition of hydrogen peroxide as catalyzer and an alkaline substance, under pressure in the presence of water.

13. The process of polymerizing vinyl esters by heating, with addition of catalyzers and an organic solvent, in the presence of water.

14. The process of polymerizing vinyl esters by heating, with addition of catalyzers and an organic solvent, under pressure in the presence of water.

15. The process of polymerizing vinyl esters by heating, with addition of catalyzers, an alkaline acting substance and an organic solvent, in the presence of water.

16. The process of polymerizing vinyl esters by heating, with addition of catalyzers, an alkaline acting substance, and an organic solvent, under pressure in the presence of water.

17. The process of polymerizing vinyl esters by heating with an aqueous solution of hydrogen peroxide and borax.

18. The process of polymerizing vinyl esters by heating with an aqueous solution of hydrogen peroxide and borax under pressure.

19. The process of polymerizing vinyl esters by heating with benzoyl peroxide and an aqueous solution of glycerin and hydrogen peroxide under pressure.

20. The process of polymerizing vinyl esters by heating with an aqueous solution containing oxidizing percompounds substantially as described.

WILLY O. HERRMANN.
ERICH BAUM.